United States Patent
Boucard et al.

(10) Patent No.: US 9,248,582 B2
(45) Date of Patent: Feb. 2, 2016

(54) METHOD FOR FABRICATING A NON-MARKING, MATTE CERAMIC

(75) Inventors: Sylvain Boucard, Villers-le-Lac (FR); Jean-Mary Hawrylko, Valdahon (FR)

(73) Assignee: Comadur S.A., Le Locle (CH)

( * ) Notice: Subject to any disclaimer, the term of this patent is extended or adjusted under 35 U.S.C. 154(b) by 85 days.

(21) Appl. No.: 13/537,421

(22) Filed: Jun. 29, 2012

(65) Prior Publication Data
US 2013/0010578 A1    Jan. 10, 2013

(30) Foreign Application Priority Data
Jul. 4, 2011   (EP) ..................................... 11172580

(51) Int. Cl.
| | |
|---|---|
| B28B 11/08 | (2006.01) |
| C04B 41/00 | (2006.01) |
| C04B 41/53 | (2006.01) |
| C04B 41/91 | (2006.01) |
| G04B 37/22 | (2006.01) |

(52) U.S. Cl.
CPC .............. *B28B 11/0818* (2013.01); *B28B 11/08* (2013.01); *B28B 11/0845* (2013.01); *C04B 41/009* (2013.01); *C04B 41/53* (2013.01); *C04B 41/91* (2013.01); *G04B 37/225* (2013.01)

(58) Field of Classification Search
CPC ...... C04B 41/53; C04B 41/91; C04B 41/009; C04B 35/00; G04B 37/225
USPC ................................................ 264/162, 678
See application file for complete search history.

(56) References Cited

U.S. PATENT DOCUMENTS

| | | | | |
|---|---|---|---|---|
| 3,030,746 | A | * | 4/1962 | Firestine et al. ................ 451/42 |
| 4,849,299 | A | * | 7/1989 | Loth .......................... 428/542.2 |
| 5,087,528 | A | * | 2/1992 | Bock .......................... 428/542.4 |
| 5,635,089 | A | * | 6/1997 | Singh et al. .............. 219/121.69 |
| 5,699,325 | A | * | 12/1997 | Bach ............................. 368/286 |
| 5,730,928 | A | * | 3/1998 | Ghosh et al. .................. 264/629 |
| 5,776,408 | A | * | 7/1998 | Ghosh et al. .................. 264/400 |
| 6,406,769 | B1 | * | 6/2002 | Delabre ....................... 428/64.1 |
| 6,861,122 | B2 | * | 3/2005 | Kawai et al. .................. 428/141 |
| 8,257,606 | B2 | * | 9/2012 | Stephan et al. ................ 216/96 |
| 8,475,036 | B2 | * | 7/2013 | Takasawa ...................... 368/280 |
| 8,540,550 | B2 | * | 9/2013 | Fujihira et al. ................ 451/41 |
| 2002/0006766 | A1 | * | 1/2002 | Haerle et al. .................... 451/39 |
| 2002/0061603 | A1 | * | 5/2002 | Eto ................................. 438/3 |
| 2003/0019843 | A1 | * | 1/2003 | Kawai et al. .................. 216/108 |
| 2003/0034122 | A1 | * | 2/2003 | Asai .............................. 156/252 |
| 2003/0128903 | A1 | | 7/2003 | Yasuda et al. |

(Continued)

FOREIGN PATENT DOCUMENTS

| | | |
|---|---|---|
| CH | 696 906 A5 | 1/2008 |
| EP | 1 840 108 A1 | 10/2007 |

OTHER PUBLICATIONS

European Search Report for EP 11 17 2580 dated Nov. 8, 2011.

*Primary Examiner* — Benjamin Schiffman
(74) *Attorney, Agent, or Firm* — Sughrue Mion, PLLC

(57) ABSTRACT

The invention relates to a method (1) for fabricating a matt ceramic part (13, 14, 15, 17, 19) comprising the following steps:
 a) fabricating (2) a ceramic part;
 b) sand blasting (7) portions of the ceramic part to make them matt;
According to the invention, the method includes the following final step:
 c) lapping (9) the matt portions in order to level out the surface of the matt portions.
The invention concerns the field of timepieces.

12 Claims, 2 Drawing Sheets

(56) References Cited

U.S. PATENT DOCUMENTS

| | | |
|---|---|---|
| 2003/0162483 A1* | 8/2003 | Saka et al. .................... 451/41 |
| 2005/0016969 A1* | 1/2005 | Kessler et al. ............. 219/121.6 |
| 2007/0228012 A1 | 10/2007 | Besson et al. |
| 2007/0270299 A1* | 11/2007 | Rosenflanz et al. ............ 501/10 |
| 2009/0162656 A1* | 6/2009 | Alary et al. .................... 428/402 |
| 2010/0178636 A1* | 7/2010 | Stephan et al. ............ 433/201.1 |
| 2010/0196685 A1* | 8/2010 | Murata et al. ................. 428/216 |
| 2012/0230166 A1* | 9/2012 | Takasawa ..................... 368/280 |
| 2012/0263022 A1* | 10/2012 | Grize et al. ................... 368/226 |
| 2013/0051200 A1* | 2/2013 | Oshio .......................... 368/296 |

* cited by examiner

METHOD FOR FABRICATING A NON-MARKING, MATTE CERAMIC

This application claims priority from European Patent Application No. 11172580.0 filed Jul. 4, 2011, the entire disclosure of which is incorporated herein by reference.

FIELD OF THE INVENTION

The invention relates to a method for fabricating a matt ceramic and, more specifically, a non-marking ceramic of this type.

BACKGROUND OF THE INVENTION

It is known to fabricate parts in matt ceramic in order to diversify their attractive appearance. However, it has been found that these parts lose their prime appeal as scratch proof parts by occasionally allowing marks to appear.

SUMMARY OF THE INVENTION

It is an object of the present invention to overcome all of part of the aforecited drawbacks by proposing a method for fabricating a matt ceramic part which maintains its advantageous attractive appearance yet also maintains its scratch proof appeal.

The invention therefore relates to a method for fabricating a matt ceramic part including the following steps:
 a) fabricating a ceramic part;
 b) sand blasting portions of the ceramic part to make them matt;
characterized in that it includes the following final step:
 c) lapping the matt portions in order to level out the surface of the matt portions.

It is thus clear that, advantageously according to the invention, the objects which come into contact with the matt ceramic part will not be scratched but will slide over the flattened areas thus preventing any crevices in the surface state from becoming blocked and leaving marks. Moreover, the ceramic advantageously maintains the desired matt appearance.

In accordance with other advantageous features of the invention:
 between step a) and step b) the method includes step d): polishing the ceramic part in order to better control the roughness of the matt portions obtained in step b);
 step b) is obtained by trovalising;
 in step d), the roughness $R_a$ obtained is less than 20 nm;
 step a) is obtained by sintering;
 step b) is performed by corundum particle blasting;
 step c) is obtained by tumbling;
 the lapping obtained in step c) is preferably comprised between 0.8 μm and 2 μm.

The invention also relates to a timepiece, characterized in that it includes at least one matt ceramic part obtained in accordance with any of the variants of the above method.

BRIEF DESCRIPTION OF THE DRAWINGS

Other features and advantages will appear clearly from the following description, given by way of non-limiting illustration, with reference to the annexed drawings, in which.

DETAILED DESCRIPTION OF PREFERRED EMBODIMENTS

Figure 1:
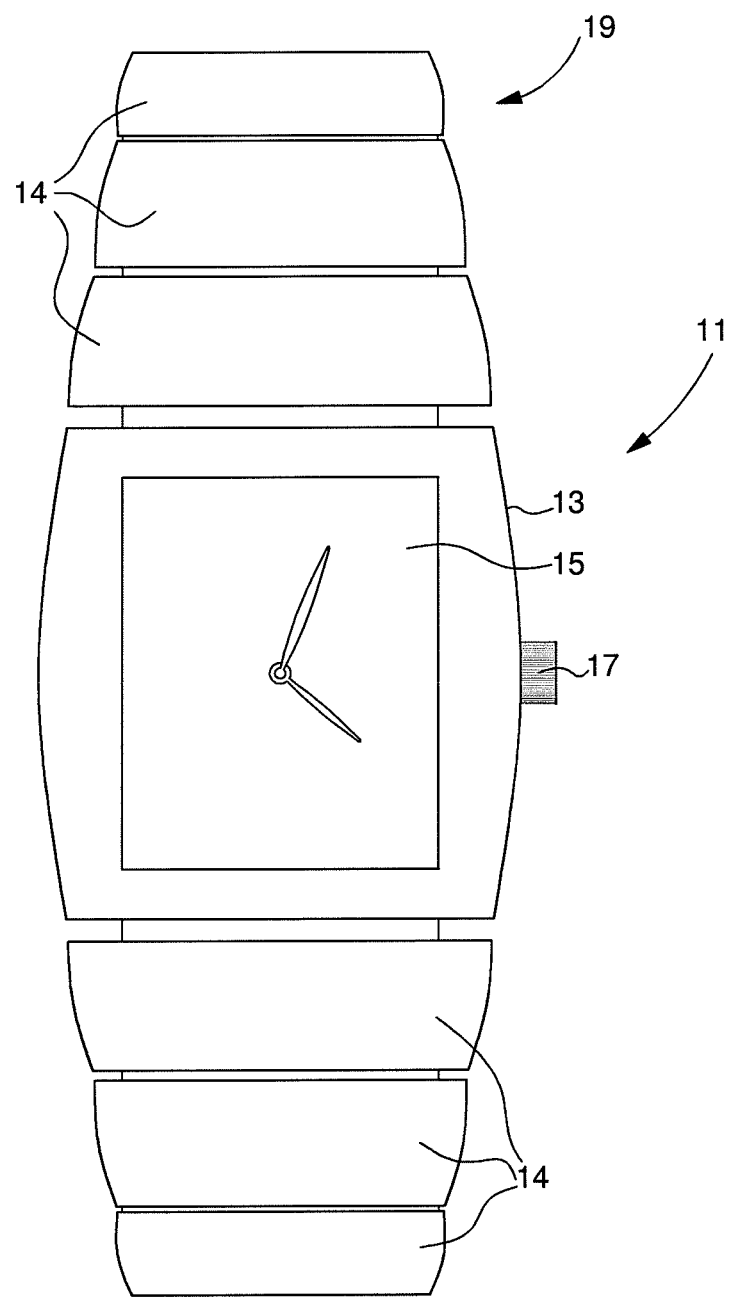
FIG. 1 is a schematic view of a timepiece.

FIG. 1 shows a timepiece 11 which may comprise at least one matt ceramic part obtained in accordance with the embodiments of method 1 explained below. Thus, the matt ceramic part may form elements of the exterior of timepiece 11, such as, in a non-limiting manner, the case 13, the bezel 15, the control means 17 and/or the bracelet or wristband 19 comprising links 14.

All these elements worn by the user may come into contact with everyday objects. After analysis, it was noted that a matt ceramic part is still scratch proof but the roughness, caused by the desired matt appearance, scratches any objects which come into contact with the part. Thus, since most of the objects encountered are made of softer material, the ceramic scratches the materials it encounters which then fill the crevices in the surface state of the part giving the impression that the part is scratched.

To overcome this finding, method 1 for fabricating a matt ceramic part will be explained with reference to FIGS. 2 to 6. As illustrated in FIG. 6, in a first embodiment, method 1 includes a first step 2 for fabricating a ceramic part. This step can be achieved by various processes. Preferably, according to the invention, step 2 is obtained by sintering.

Method 1 continues with a second step 7 for sand blasting portions of the ceramic part to make them matt. Step 7 is preferably obtained by localised alumina particle blasting of the portions of the part which it is desired to make matt. Indeed, it was demonstrated that glass bead sand blasting was unsatisfactory. It is preferable, according to the invention, to use corundum particles.

Figure 2:
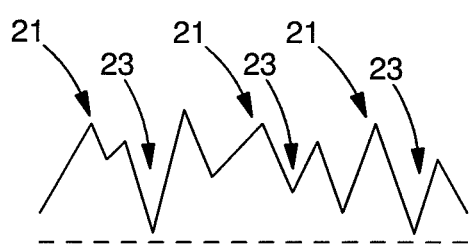
FIGS. 2 and 3 are schematic views of the surface state according to a first embodiment of the invention.
Figure 4:
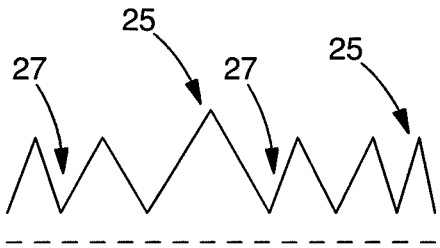
FIGS. 4 to 5 are schematic views of the surface state according to a second embodiment of the invention.

As visible in FIG. 2, in the first embodiment, the surface state of the part is modified to form peaks 21 which are very aggressive against objects formed of softer materials and crevices 23 of very unequal depths comprised between 5 μm and 8 μm.

Finally, advantageously according to the invention, the fabrication method 1 according to the invention includes a final step 9 for lapping the matt portions so as to level out the surface state of the matt portions and thus prevent the materials of scratched objects from filling the hollows in the surface state of the matt ceramic. Preferably, according to the invention, step 9 is achieved by tumbling to obtain lapping of between 3 μm and 7 μm.

Figure 3:
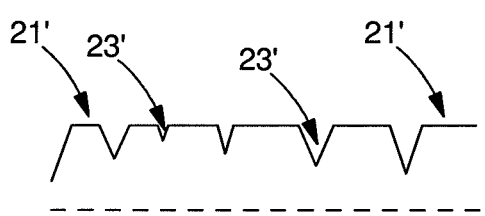

As visible in FIG. 3, in the first embodiment, the surface state of the part is modified to plane peaks 21 and form substantially flat areas 21' between crevices 23' the depths of which are decreased or cancelled out.

It is thus clear that, advantageously according to the first embodiment of the invention, the objects that come into contact with the matt ceramic part will no longer be scratched, but will slide over the substantially flat areas 21' and the ceramic will still maintain its matt appearance.

As illustrated in FIG. 6, in a second embodiment, method 1 includes a first step 2 for fabricating a ceramic part as in the first embodiment.

In the second embodiment, method 1 continues with a second step 5 of polishing the ceramic part to improve control of the roughness of the matt portions obtained in step 7. Preferably according to the invention, step 5 is performed by trovalising to obtain a roughness $R_a$ of less than 20 nm.

Method 1 continues with a third step 7 which is substantially identical to that of the first embodiment. Thus, as visible in FIG. 4, in the second embodiment, the smooth surface state of the part is modified to form peaks 25 which are aggressive against objects formed of softer materials and crevices 27 the depths of which are of very homogeneous and comprised between 1.5 µm and 3 µm.

Finally, advantageously according to the invention, fabricating method 1 according to the invention includes a final step 9 substantially identical to that of the first embodiment. Preferably, according to the second embodiment of the invention, lapping of between 0.8 µm and 2 µm is obtainable in step 9.

Figure 5:
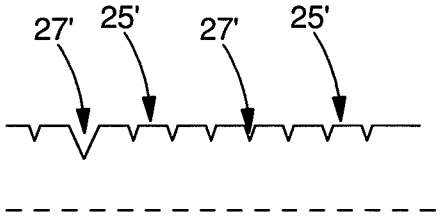
Figure 6:
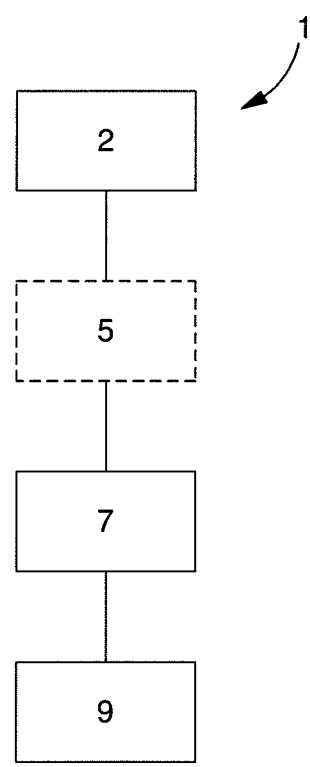
FIG. 6 is a flow diagram of a method for fabricating a matt ceramic part according to the invention.

As visible in FIG. 5, in the second embodiment, the surface state of the part is modified to plane the peaks 25 and form substantially flat areas 25' between crevices 27' which are more homogeneous than in the first embodiment and the depths of which are decreased or cancelled out.

It is thus clear that, advantageously according to the second embodiment of the invention, the objects that come into contact with the matt ceramic part will no longer be scratched, but will slide over the substantially flat areas 25' and the ceramic will still maintain its matt appearance with greater rendering homogeneity than the first embodiment.

Of course, this invention is not limited to the illustrated example but is capable of various variants and alterations that will appear to those skilled in the art. In particular, the applications of the invention are not limited to the field of timepieces. Thus, by way of example, jewellery may be envisaged.

Likewise, the example embodiments of steps 2 to 9 of the method 1 are not limited to the techniques used. In particular, other lapping and polishing techniques may be envisaged.

What is claimed is:

1. A method for fabricating a matt ceramic part comprising the following steps:
   a) fabricating a ceramic part;
   b) sand blasting portions of the ceramic part to make them matt in modifying the surface state of the portions of the ceramic part to form peaks and crevices;
   c) lapping the matt portions in order to level out the surface of the matt portions so as to plane the peaks and to form substantially flat areas between the crevices,
   wherein the ceramic part maintains a matt appearance after said lapping step.

2. The method according to claim 1, wherein step a) is obtained by sintering.

3. The method according to claim 1, wherein step b) is obtained by corundum particle blasting.

4. The method according to claim 1, wherein step c) is obtained by tumbling.

5. The method according to claim 1, wherein the lapping depth obtained in step c) is comprised between 3 µm and 7 µm.

6. A method for fabricating a matt ceramic part comprising the following steps:
   a) fabricating a ceramic part;
   b) polishing the ceramic part;
   c) sand blasting portions of the polished ceramic part to make them matt in modifying the surface state of the portions of the ceramic part to form peaks and crevices;
   d) lapping the matt portions in order to level out the surface of the matt portions so as to plane peaks to form substantially flat areas between the crevices,
   wherein the ceramic part maintains a matt appearance after said lapping step.

7. The method according to claim 6, wherein step d) is obtained by trovalising.

8. The method according to claim 7, wherein, in step d), the roughness Ra obtained is less than 20 nm.

9. The method according to claim 6, wherein the lapping depth obtained in step d) is comprised between 0.8 µm and 2µm.

10. The method according to claim 6, wherein step a) is obtained by sintering.

11. The method according to claim 6, wherein step c) is obtained by corundum particle blasting.

12. The method according to claim 6, wherein step d) is obtained by tumbling.

* * * * *